(12) United States Patent
Booij et al.

(10) Patent No.: US 11,294,025 B2
(45) Date of Patent: Apr. 5, 2022

(54) ULTRASOUND POSITION-DETERMINATION SYSTEM

(71) Applicant: Sonitor Technologies AS, Oslo (NO)

(72) Inventors: Wilfred Edwin Booij, Oslo (NO); Cyril Antille, Oslo (NO); Øystein Haug Olsen, Oslo (NO)

(73) Assignee: Sonitor Technologies AS, Oslo (NO)

( * ) Notice: Subject to any disclaimer, the term of this patent is extended or adjusted under 35 U.S.C. 154(b) by 119 days.

(21) Appl. No.: 16/491,944

(22) PCT Filed: Mar. 5, 2018

(86) PCT No.: PCT/GB2018/050554
§ 371 (c)(1),
(2) Date: Sep. 6, 2019

(87) PCT Pub. No.: WO2018/162885
PCT Pub. Date: Sep. 13, 2018

(65) Prior Publication Data
US 2021/0141051 A1    May 13, 2021

(30) Foreign Application Priority Data
Mar. 7, 2017   (GB) ...................................... 1703647

(51) Int. Cl.
*G01S 5/30* (2006.01)
(52) U.S. Cl.
CPC ...................................... *G01S 5/30* (2013.01)
(58) Field of Classification Search
CPC ........................................................ G01S 5/30
(Continued)

(56) References Cited

U.S. PATENT DOCUMENTS

| 6,292,106 B1 | 9/2001 | Solinsky et al. |
| 2003/0008622 A1 | 1/2003 | Fernandez-Corbaton et al. |
| 2014/0198619 A1 | 7/2014 | Lamb et al. |

FOREIGN PATENT DOCUMENTS

| EP | 2 389 598 A2 | 11/2011 |
| EP | 2 389 598 B1 | 11/2016 |

(Continued)

OTHER PUBLICATIONS

International Search Report dated May 5, 2018 for Appl. No. PCT/GB2018/050554, 4 pages.

(Continued)

*Primary Examiner* — Daniel L Murphy
(74) *Attorney, Agent, or Firm* — Sterne, Kessler, Goldstein & Fox P.L.L.C.

(57) ABSTRACT

A system is provided for determining the position of a mobile receiver unit in an environment. The system comprises: a transmission apparatus comprising a plurality of ultrasound transmitters configured to transmit a plurality of ultrasonic signals in different respective principal directions, each encoding a different respective direction identifier; a mobile receiver unit comprising an ultrasound receiver configured to receive the plurality of ultrasonic signals along a plurality of signal paths, at least one of which includes a reflection off an environment surface; and a processing system comprising a decoder arranged to decode the respective direction identifiers from the received signals. The processing system is configured to determine a respective time of arrival for each signal, and use location information relating to the transmission apparatus and the environment surface, together with the respective direction identifiers and times of arrival to calculate an estimated position of the mobile receiver unit.

15 Claims, 4 Drawing Sheets

(58) Field of Classification Search
USPC .......................................................... 367/117
See application file for complete search history.

(56) References Cited

FOREIGN PATENT DOCUMENTS

| JP | 2005077175 A | 3/2005 |
|----|----|----|
| JP | 2006506830 A | 2/2006 |
| JP | 2006514743 A | 5/2006 |
| JP | 2014513287 A | 5/2014 |
| JP | 2017032535 A | 2/2017 |
| WO | WO 2004/059338 A2 | 7/2004 |
| WO | WO 2005/088339 A1 | 9/2005 |
| WO | WO 2010/084308 A2 | 7/2010 |
| WO | WO 2012/137017 A2 | 10/2012 |
| WO | WO 2014/020348 A1 | 2/2014 |
| WO | WO 2016/174396 A1 | 11/2016 |

OTHER PUBLICATIONS

Written Opinion dated May 5, 2018 for Appl. No. PCT/GB2018/050554, 7 pages.
Allen et al., "Image method for efficiently simulating small-room acoustics" J. Acoust. Soc. Am. 65(4), Apr. 1979, pp. 943-950, 8 pages.
Miyara, et al., "Evaluation of Signal Detection Using the Serial Search Method on Indoor Positioning System Using Spread Spectrum Ultra Sound Waves", Mar. 1, 2016, Institute of Electronics, Information and Communication Engineers, p. 501, 1 page.
Japanese Office Action dated Oct. 13, 2021 for Japanese Application No. 2019-548670 (with machine translation), 7 pages.

ULTRASOUND POSITION-DETERMINATION SYSTEM

BACKGROUND

Field

This invention relates to systems and methods for determining the position of a mobile unit using ultrasound signals.

Background Information

It is known to use ultrasound to determine the position of a mobile unit, or tag, in three dimension by transmitting ultrasonic signals from a plurality of static transmitter units at known positions in the environment (e.g., on the walls or ceilings of a building). These signals are received by the mobile receiver unit, which may be attached to an object. Given the positions of the static transmitter units, the times of arrival of the ultrasonic signals at the mobile unit can be used to estimate the position of the mobile unit in the environment, using standard geometric calculations. An example of such a system is described in U.S. Pat. No. 6,292,106 (Cubic Defence Systems, Inc.).

Ultrasound is well suited to use in positioning systems, especially indoors, as it travels much slower than radio waves and light. It therefore requires less accurate time measurements for a given spatial resolution, compared with speed-of-light signals.

However, known ultrasound-based positioning systems typically require a clear line-of-sight path between each static transmitter unit and the mobile receiver unit in order to give accurate results. This is because any significant obstruction (larger than one wavelength in size) will cause an ultrasonic wave to undergo reflection, absorption or a combination of both. This means that a signal can easily be blocked from reaching a mobile unit when the mobile unit is shielded by the human body, or by any other obstruction in the line of sight from a static transmitter unit. When this happens, reflections off surfaces in the environment may arrive at the mobile unit with greater energy than a direct-path signal and so may be incorrectly identified as direct-path signals, leading to substantial errors in estimating the position of the mobile unit. Known ultrasound-based positioning systems are also often expensive to install and maintain.

BRIEF SUMMARY

The present invention seeks to address at least some of these shortcomings.

From a first aspect, the invention provides a method of determining the position of a mobile receiver unit in an environment, the method comprising:
 transmitting a plurality of ultrasonic signals in different respective principal directions from a transmission apparatus, each of the ultrasonic signals communicating a different respective direction identifier;
 receiving the plurality of ultrasonic signals at the mobile receiver unit along a plurality of signal paths, wherein at least one of the signal paths includes a reflection off a surface in the environment;
 identifying the respective direction identifiers from the received ultrasonic signals;
 for each of the signal paths, determining a respective time of arrival of the respective ultrasonic signal at the mobile receiver unit; and
 using (i) location information relating to the transmission apparatus, (ii) location information relating to the surface, (iii) said respective direction identifiers, and (iv) said times of arrival, to estimate the position of the mobile receiver unit.

From a further aspect, the invention provides a system for determining the position of a mobile receiver unit in an environment, the system comprising:
 a transmission apparatus, comprising a plurality of ultrasound transmitters and being configured to transmit a plurality of ultrasonic signals in different respective principal directions from the transmission apparatus, each ultrasonic signal communicating a different respective direction identifier;
 a mobile receiver unit, comprising an ultrasound receiver and being configured to receive the plurality of ultrasonic signals along a plurality of signal paths, wherein at least one of the signal paths includes a reflection off a surface in the environment; and
 a processing system,
 wherein:
 the processing system is arranged to identify the respective direction identifiers from the received ultrasonic signals;
 the processing system is configured to determine, for each of the signal paths, a respective time of arrival of the respective ultrasonic signal at the mobile receiver unit; and
 the processing system is configured to use (i) location information relating to the transmission apparatus, (ii) location information relating to the surface, (iii) said respective direction identifiers, and (iv) said times of arrival, to calculate an estimate of the position of the mobile receiver unit.

Thus it will be seen by those skilled in the art that, in accordance with the present invention, the time of arrival of a reflected signal at the mobile unit is used to determine the position of the mobile unit, in addition to the times of arrival of other signals, which may or may not also be reflected signals. Instead of reflections being an unwelcome source of error, the present invention positively exploits reflections off a surface in the environment (such as a wall or floor of a room) to increase positioning accuracy and potentially to reduce the number of separate transmitter units needed to provide coverage of a room or area. Using the present invention, it may be possible in some situations that a single transmitter unit—e.g., mounted on the ceiling of a room—is sufficient to enable the position of the mobile unit to be determined in three dimensions anywhere in a room, with an accuracy of a few centimeters or better, and with resilience to obstruction of the line-of-sight path from the transmitter unit to the mobile receiver unit. By comparison, prior-art systems can require four or more separate units to be installed in a room in order to give comparable performance. A system that requires fewer static units to be installed is desirable as it can be cheaper to install (both equipment costs and installation costs), and cheaper to maintain (e.g., fewer batteries to replace).

While the transmission apparatus might comprise a plurality of separate units (preferably located in close proximity to each other), in preferred embodiments, the transmission apparatus is a single transmitter unit. The transmission apparatus is preferably static—e.g., fixed to a wall or ceiling or other surface of a building or room. The ultrasound transmitters of the transmission apparatus or unit are preferably all located close to one another—e.g., within an area or volume having a maximum dimension equal to 100 cm, 50 cm, 30 cm or less. This makes it easier for the processing system to identify the surface that the reflection has come off, and hence identify the correct location information relating to the surface, as is explained in more detail below. The system may comprise a plurality of similar transmission apparatuses or transmitter units, which may be installed in different respective rooms or regions of a site, or which may be installed so as to provide overlapping coverage of a common region.

The present applicant has previously described, in WO 2010/84308 (the entire contents of which are hereby incorporated by reference), a system in which a mobile transmitter unit transmits one signal, which is received along direct and reflected paths at a static receiver unit. The arrival times for the different paths are used to determine the location of the mobile transmitter unit. The applicant is not, however, aware of any published systems in which a mobile receiver unit receives a plurality of distinguishable ultrasonic signals, transmitted in different directions by a static transmitter unit, and in which a reflection of one of these signals helps to determine the location of the mobile receiver unit. The skilled person will appreciate that such a system is architecturally quite different from that disclosed in WO 2010/84308, in which the same one transmitted signal is received at a static receiver station along multiple paths. By transmitting directional signals to mobile receiver units, which communicate different respective identifiers, embodiments of the present invention can support an arbitrarily large number of mobile receiver units, whereas a system as described in WO 2010/84308 can support only a limited number of mobile units, determined by the acoustic bandwidth of the system.

It will be appreciated that each ultrasonic signal is likely to reach the mobile receiver unit along a number of different paths, one of which may be a direct path, and others of which may include one or more reflections off surfaces in the environment. The positioning accuracy can be improved by intentionally trying to increase the signal strength along certain paths, compared with other others, by using directional transmissions.

Thus, the plurality of ultrasound transmitters in the transmission apparatus preferably comprises at least two directional transmitters. It may comprise four or more directional transmitters. The plurality of ultrasound transmitters may comprise one or more omnidirectional transmitters. A signal from an omnidirectional transmitter preferably also communicates a direction identifier (thereby allowing the receiver to identify a reception of the signal, along a particular path, as being the reception of an omnidirectional signal). It will be appreciated that the terms "directional" and "omnidirectional" may here be understood in a relative sense. Even an omnidirectional transmitter may have some directivity—for example, it may emit energy over a half-sphere or less, rather than over a full sphere. The principal direction for a transmitted ultrasonic signal may be the direction of highest energy of the signal. Where the signal is generated by a single transducer, this will typically correspond to the primary axis of the transducer. Of course, any ultrasonic signal will travel over a range of directions, even when transmitted from a highly directional transducer. For an omnidirectional speaker (transmitter), the principal direction may be primary axis of the speaker.

At least one of the plurality of ultrasound transmitters may comprise a directional transmitter having a half-angle of between 10 and 60 degrees at a frequency of one of the ultrasonic signals; preferably between 20 and 50 degrees; for example 30 or 45 degrees. An omnidirectional one of the transmitters may not have a half-angle (i.e., its angular variation is less than 6 dB) or may have a half-angle greater than that of a directional one of the transmitters—preferably greater than 60 degrees. A directional one of the transmitters may be inherently directional—e.g., an inherently directional piezoelectric transducer—or it may comprise an omnidirectional speaker with a waveguide or shielding to add or enhance directionality. An omnidirectional one of the transmitters may be inherently omnidirectional, or it may comprise a directional speaker with a diffraction member, such as a sheet defining an orifice, located in front of the speaker, to diffract the sound.

The transmission apparatus may comprise at least one pair of transmitters that are configured to transmit ultrasonic signals along respective principal directions that are coplanar vectors (i.e., that lie in, or parallel to, a common plane), preferably not parallel to one another—e.g., angled at least 45 degrees or 60 degrees or 90 degrees or more apart, but preferably less than 180 degrees. This can facilitate using signal strength to identify signal paths and reflecting surfaces. An axis of an omnidirectional transmitter may lie within an acute angle between the two vectors—e.g., bisecting an angle between them. If the signals are transmitted on opposite sides of the transmission apparatus, it can, for instance, make it relatively straightforward to determine on which side of the transmission apparatus the mobile receiver unit is located, by comparing the respective signal strengths received by the mobile receiver unit. In preferred embodiments, the transmission apparatus comprises two such pairs of transmitters, each pair being directed parallel to a respective plane, wherein the two planes are orthogonal planes.

At least one of the signal paths may be a direct path. An advantage of the transmission apparatus having at least one omnidirectional transmitter is that it increases the chances of a direct-path signal being received by the mobile receiver unit, wherever the mobile receiver unit is located. However, if there is no direct line of sight between the transmission apparatus and the mobile receiver unit, it may still be possible to estimate the location of the mobile receiver unit using only reflected signal paths (echoes). Thus, in some embodiments, a direct acoustic signal is used when such is available, but an indirect path is used when no direct path exists.

The transmission apparatus may comprise a casing or enclosure, such as a box, and the plurality of ultrasound transmitters may be arranged to transmit ultrasound in different respective directions from different respective positions on the casing or enclosure.

In some embodiments, the transmission apparatus may comprise a one-dimensional or two-dimensional array of transducers, and a controller for transmitting ultrasonic signals from the array of transducers in different directions using beam-forming. An ultrasound transmitter, as described herein, may be provided by one or more phased arrays of transducers.

Preferably, however, each ultrasound transmitter is formed from a single respective transducer or loudspeaker—e.g., having a single diaphragm, piezoelectric crystal, or other active element. Each principal direction in which ultrasonic signals are transmitted is preferably associated with a different respective ultrasound transmitter. This avoids the complexity of controlling a phased array. It also makes it easier to transmit the plurality of ultrasound signals simultaneously in different directions. Moreover, in some embodiments, estimating the position of the mobile receiver unit makes use of the physical separation between the ultrasound transmitters on the transmission apparatus, as described in more detail below.

The plurality of ultrasound signals may be transmitted simultaneously. Alternatively, the transmissions may be offset in time; however, this may potentially lead to a reduction in precision if the mobile receiver unit is in motion, or if the environment changes over time (e.g., if an obstacle blocks a certain path part way through a particular transmission cycle).

The direction identifiers may be communicated by the ultrasonic signals in any appropriate way.

The identifiers may be encoded in the ultrasonic signals, according to an encoding scheme—e.g., using any combination of frequency-based encoding, phase-based encoding, amplitude-based encoding, and time-based encoding. The identifiers may, for example, be encoded using frequency-shift-key (FSK) encoding. In a preferred set of embodiments, the direction identifiers are encoded on a carrier signal using phase-shift-keying (PSK). The identifiers may additionally or alternative be encoded using direct-sequence spread spectrum (DSSS) encoding. In some embodiments, each ultrasonic signal comprises one or more chipping sequences, such as Barker codes. Each signal may, for instance, be a signal as described in WO 2012/137017, by the present applicant, the entire contents of which are hereby incorporated by reference.

In another set of embodiments, the direction identifiers may be communicated wholly or partially through the use of time slots, or another timing-based communication scheme. The plurality of ultrasonic signals may be transmitted according to a transmission schedule, with each transmission time or time slot in the schedule being a respective direction identifier. The processing system may use information relating to the transmission schedule to identify the respective direction identifiers from the received ultrasonic signals. The transmission times may be arranged so that all echoes from one ultrasound signal have reduced to below a threshold level in the environment before a subsequent ultrasound signal is transmitted. The ultrasonic signals may also encode direction-specific data, but they could be simple pulses or identical chirps or patterns, with just the timing information being used to communicate the direction identifiers.

The direction identifiers may be unique across the whole system, or they may be unique within a particular zone or area, or only within a particular transmitter unit. In some embodiments, other information may be used to distinguish between transmissions from different transmission apparatuses within the system—e.g., by having different transmission apparatuses transmit in different predetermined time slots, or transmitting additional data as part of, or separately from, the direction identifiers, such as a transmitter unit identifier, or a zone or area identifier. In some embodiments, the transmission apparatus may transmit an FSK-encoded zone ID and area ID as described in WO 2014/020348, by the present applicant, the entire contents of which are hereby incorporated by reference.

The times of arrival of the ultrasonic signals may be determined as absolute times (e.g., defined by a system clock or a signal from an external clock, to which the mobile receiver unit may be synchronized), or relative timings could be used. For example, the times may be relative to the arrival of the direct acoustic signal at the receiver; i.e., this first arrival event defines a 'time zero', from which intervals to the later-arriving echo or echoes are measured.

Each time of arrival may be determined using one or more cross-correlation operations.

In a preferred set of embodiments, each ultrasonic signal comprises a chipping sequence, encoded on a respective carrier signal at a chip rate (preferably phase-shift-keying-encoded). The mobile receiver unit or the processing system preferably samples the received signal at a sampling rate which is higher than, preferably at least twice as high as, the chip rate. It may initially sample the received signal at a higher rate and then down-sample (e.g., using decimation) to a lower sampling rate that is still greater than the chip rate—preferably at least twice the chip rate—but preferably no more than 16, 8 or 4 times the chip rate. The sampling rate may equal twice the chip rate. The received signal may be separated into an in-phase signal (I) and a quadrature signal (Q), which may each be sampled at the sampling rate.

The sampled signal may then be cross-correlated with the chipping sequence, preferably at the sampling rate, to generate data representing correlation magnitude over time. A derivative of correlation magnitude data over time may be used to identify a peak in the correlation magnitude data. The position of the peak may be determined at a temporal resolution that is finer than the sampling rate and/or finer than the chipping rate. The time of arrival of the signal may then be determined from the temporal position of the peak in the correlation magnitude data.

One way to identify a peak in the correlation magnitude data, at a temporal resolution that is finer than the sampling rate, is to use a peak detector. The peak detector may be implemented in any appropriate way. However, in a preferred set of embodiments, the peak detector identifies peaks based on a sliding window spanning three successive sample points. At each point in the correlation magnitude data, a gradient before the point and a gradient after the point is preferably used to identify a peak. These gradients are preferably also used to estimate the location of the peak based on the respective magnitudes of the gradients. This allows the position of a peak to be determined with sub-sample accuracy. For example, if one gradient has a larger absolute value than the absolute value of the other gradient, the processing system may estimate the peak as being offset from the mid-point in the direction of the shallower gradient.

Such an approach has been found to facilitate extremely accurate time-of-arrival measurements. For example, it is commonly held that the maximum spatial resolution for acoustic positioning is approximately equal to the speed of sound divided by the chip rate (e.g., (340 m/s)/(500 chips/s)=68 cm). However, the present technique can allow for a spatial resolution around a tenth of this (e.g., around 7 cm, at 500 chips/s). This idea is believed to be novel in its own right.

From a further aspect, the invention provides a method for measuring the time of arrival of a signal, the method comprising:

receiving a signal comprising a chipping sequence, encoded on a carrier signal at a chip rate;

sampling the received signal at a sampling rate which is higher than the chip rate;

cross-correlating the sampled signal with the chipping sequence, at the sampling rate, to generate data representing correlation magnitude over time;

using the derivative of the correlation magnitude data over time to determine a position of a peak from the correlation magnitude data, at a temporal resolution that is finer than the sampling rate; and determining the time of arrival of the signal from the temporal position of the peak in the correlation magnitude data.

From another aspect, the invention provides receiver apparatus comprising:

a signal receiver arranged to receive a signal comprising a chipping sequence, encoded on a carrier signal at a chip rate;

a sampler arranged to sample the received signal at a sampling rate which is higher than the chip rate;

a correlator arranged to cross-correlate the sampled signal with the chipping sequence, at the sampling rate, to generate data representing correlation magnitude over time; and a processing system arranged to use the derivative of the correlation magnitude data over time to determine a position of a peak from the correlation magnitude data, at a temporal resolution that is finer than the sampling rate, and thereby to determine a time of arrival of the signal at the receiver apparatus.

The signal may be any electromagnetic or acoustic signal. However, preferably it is an ultrasonic signal. The time of arrival may be determined relative to a local timer or clock, or to any other suitable reference. The receiver apparatus may be a receiver unit, and the processing system may be part of the receiver unit. Alternatively, some or all of the processing system may be remote from a receiver unit—e.g., in a network server.

The chipping sequence is preferably phase-shift-key-encoded on the carrier signal. The sampling rate is preferably at least twice as high as the chip rate.

Features of any other aspect or embodiment described herein may be features of these aspects also.

In the positioning systems and methods described above, a reflection from any surface in the environment (which may be a room or building or outside space) could potentially be used for estimating the position of the mobile unit, but preferably the surface is a static surface and preferably it is substantially planar. In such embodiments the reflecting surface effectively acts as a 'sonic mirror'. By suitable processing of the received signals, the surface gives the appearance, to the mobile receiver unit, of a second, virtual transmission apparatus, at the same distance from the surface as the real transmission apparatus is. Of course, by considering multiple reflecting surfaces, multiple such virtual transmitters arise. In some embodiments there are a plurality of surfaces, and a plurality of the signal paths include reflections off surfaces in the environment. Respective location information relating to each of the plurality of surfaces may be used when estimating the position of the mobile receiver unit.

Such "virtual" transmission apparatuses may be used to help determine the position of the mobile receiver unit by the processing system operating as if there were multiple real transmission apparatuses or units in the corresponding positions and there were no reflecting surfaces. In other words each virtual transmitter in a virtual transmission apparatus may be considered as if it had transmitted its ultrasound signals directly along a straight path to the mobile receiver unit. A set of possible positions for each virtual transmitter can be determined from the known positions of the real transmitter and the reflecting surface or surfaces. Once the surfaces corresponding to the various received signals have been identified, a trilateration or multilateration calculation, using conventional spherical (time-of-arrival) or hyperbolic (time-difference-of-arrival) methods, may be performed by the processing system to estimate the position of the mobile receiver unit.

In some embodiments, the signal strength of an echo, or reflection, is used when determining the position of the mobile receiver unit—e.g., by using the signal strength to estimate the length of a signal path that includes a reflection off a surface. The system may use knowledge of the spherical and dissipative attenuation of ultrasound in air and/or of the reflective characteristics of the major surfaces in the environment to improve the position estimation.

The location information relating to the transmission apparatus preferably comprises information about the position of the transmission apparatus in space—preferably in three dimensions—to a suitable level of precision, and in a suitable coordinate system. The information preferably comprises information about the orientation of the transmission apparatus, or information about the positions and/or orientations of the respective transmitters.

The location information relating to the surface preferably comprises information about the position and/or size and/or shape and/or orientation of the surface.

The system may comprise a database that stores the location information relating to the transmission apparatus and/or relating to the surface. The database may store information about the locations of some or all of the walls, floors and ceilings of a room or building. It may store the locations of other reflective surfaces, such as the top of a table or a desk, the positions of windows, etc. It may store the positions and orientations of a plurality of transmitter units in the room or building. The processing system may access the database in order calculate the estimate of the position of the mobile receiver unit.

The mobile receiver unit preferably comprises a timer or clock which is synchronized to a timer or clock for the transmission apparatus. This synchronization may be performed by adjusting one of the clocks, or a derived timing signal, on the mobile receiver unit or on the transmission apparatus, or by adjusting receive time stamps on the mobile receiver unit. Alternatively, it may be performed remotely—e.g., by allowing the clocks on the mobile receiver unit and the transmission apparatus to run, but storing information relating to the offset (and optionally drift) between the clocks on a remote computer or server (which may form part of the processing system described above), and using this to information to determine a time of flight of each ultrasonic signal—e.g., by adjusting transmission and reception time stamps according to the stored offset and drift.

The transmission apparatus is preferably configured to transmit the ultrasonic signals at a predetermined time or times. In this way, the processing system can determine a time of flight (ToF) of each received ultrasonic signal from the arrival times—e.g., by basic subtraction operations. It will be appreciated that, assuming a constant speed of sound, the time of flight corresponds to a measure of the path length, for each path.

However, synchronization is not essential, and in some embodiments the processing system uses time-difference-of-arrival (TDoA) information to estimate the position of the mobile receiver unit.

The mobile receiver unit is preferably configured to determine signal strength information for each received signal.

The processing system preferably filters out arrival times associated with signals having a signal strength below a minimum threshold. Such peaks are likely to come from small reflective surfaces whose locations are not known to the system. The threshold is preferably scaled down with increasing distance (i.e., based on time elapsed between the known transmission time of the particular signal and its time of arrival at the mobile receiver unit)—preferably exponentially, e.g., with distance squared.

Estimating the position of the mobile receiver unit preferably comprises any one or more of the following operations:

associating each received signal with a respective signal path;

calculating an initial position estimate for the mobile receiver unit; and using the times of arrival to perform multilateration to estimate the position of the mobile receiver unit.

Associating each received signal with a respective signal path preferably uses signal strength information and the times of arrival (referred to herein as "path assignment"). The processing system preferably filters the arrival times for signal paths from an omnidirectional speaker, so as to retain a set, preferably of predetermined size, containing the omnidirectional arrival times associated with the largest respective signal strengths.

The processing system preferably identifies one or more clusters of arrival times for signals encoding different respective direction identifiers which are, for each cluster, within a predetermined maximum time-of-flight distance window of each other. This distance window is preferably no greater than a maximum separation distance between the transmitters of the transmission apparatus, optionally plus a fixed margin—e.g., a margin of up to 5 cm or 10 cm, or 5% or 10% or 50% or 100% of the separation distance. This increases the likelihood that all the peaks in a cluster relate to signals that have followed the same path to the receiver unit. In some embodiments, each cluster must contain a signal from an omnidirectional transmitter. Thus, in some embodiments, the respective direction identifiers in each cluster may be identified as being from signals that arrive within a predetermined maximum time-of-flight distance (e.g., half of said distance window) from a respective signal arrival time from an omnidirectional transmitter.

Where all the times of arrival in the cluster are for signals that have followed substantially the same path as each other—i.e., a direct path, or a path having one or more reflections off the same surfaces—these can be used to identify the signal path.

However, some clusters may contain signal arrival times from different paths. The processing system preferably uses the respective signal strengths and/or the differences in the times of arrivals of the signals to filter out clusters that have not all followed the same path. Where one or more pairs of transmitters are arranged to face in opposing directions, the processing system preferably uses the signal strengths of the pair of transmitters, and optionally also the strength of a signal from the omnidirectional speaker, to test whether a cluster contains reflections from only one path.

The processing system may be configured to calculate an angle of arrival, in two or three dimensions, of a path, from the signal strengths of signals arriving in a cluster. To do so, the processing system may calculate one or more ratios of signal strength—e.g., a ratio between the strength of a signal from an omnidirectional transmitter and the strength of a signal from an directional transmitter. The processing system may use the angle of arrival and/or path length (e.g., determined from the time-of-flight of the omnidirectional signal) to filter out clusters that contain one or more signals whose times of arrival are not consistent with the positions of the transmitters in the transmission apparatus—i.e., do not satisfy a consistency test that is based on the positions of the transmitters on the transmission apparatus. A subset of clusters may be selected—e.g., those having a consistency score above a threshold.

Calculating an initial position estimate for the mobile receiver unit preferably uses signal strength information and the times of arrival. Once one or more clusters has been found that is likely to contain only the arrival times of signals that have all travelled along the same path to the mobile receiver unit, the times of arrivals of the signals (which are known very accurately) are preferably used to calculate an angle of arrival (or vector), in two or three dimensions. This should be more accurate than the angle estimate based only on signal strength.

Each of these vectors represents a direction from the mobile receiver unit to a real or "virtual" image of the transmission apparatus, along a straight path. The processing system preferably uses amplitude and/or distance information and/or angle-of-arrival information for each vector to assign the vector to a real or virtual transmission apparatus position. A set of candidate positions is known in advance, or can be calculated as required, from the position of the transmission apparatus and the reflective surface or surfaces (which act as mirrors). The processing system may also use information about the positions of the transmitters on the transmission apparatus to determine whether a path includes an odd or even number of reflections, and may use this information when assigning the vector to a real or virtual transmission apparatus position. This is because the parity of the reflections determines whether the layout of the transmitters appears as it truly is, or as a mirror image (i.e., whether it appears left-handed or right-handed to the mobile receiver unit).

The multilateration operation uses the times of arrival, but preferably does not directly use signal strength information. The multilateration preferably assumes straight-line paths between the mobile receiver unit and respective real and "virtual" transmission-apparatus locations. It preferably uses an iterative algorithm, such as a minimization or approximation algorithm—e.g., least-squares minimization. The initial position estimate, or a position estimate from an earlier positioning cycle or operation, is preferably used to initiate the iterative minimization algorithm.

The mobile receiver unit may be a dedicated positioning tag—e.g., comprising means for fastening the tag to a person or an object, for tracking the person or object—or it may be a portable electronics appliance, having additional functions, such as a mobile telephone or a tablet computer.

The mobile receiver unit may contain all of the processing system—this may be particularly appropriate when the mobile receiver unit has a display screen and powerful processor, for instance if it is a smartphone. In this case, the mobile receiver unit may be arranged to store the location information relating to the transmission apparatus and/or the location information relating to the surface.

In other embodiments, the mobile receiver unit may comprise some parts of the processing system—e.g., comprising a decoder or other module for identifying the direction identifiers and/or comprising elements that determine the arrival times of the signals—while other parts of the processing system—e.g., elements that are configured to calculate the estimate of the position of the mobile receiver unit—may reside in one or more other units, such as on a remote computer or server. The mobile receiver unit may comprise a radio, optical, or other transmitter—e.g., a Bluetooth, WiFi or cellular network transmitter. It may use the transmitter to transmit data relating to the received ultrasound signals to a remote processing unit.

In one set of embodiments, even identifying the direction identifiers occurs away from the mobile receiver unit. In this case, the receiver unit may essentially stream the received audio signals (optionally after some processing, such as demodulation, down-sampling or compression) to a remote receiver.

The position-determining system preferably further comprises data storage and/or a display and/or a data connection, and is arranged to store and/or display and/or communicate electronically the estimated position of the mobile receiver unit. The system may, for example, be arranged to indicate the position of the mobile received unit on a map or plan of a building or environment.

Ultrasound is sound that is above the normal range of human hearing (particularly that of adults). Typically, it is sound above 20 kHz. The ultrasound signals in embodiments of the present invention may be around 20 kHz or higher, such as at around 40 kHz. Frequencies of around 20 kHz (e.g., greater than 18 kHz, 19 kHz or 20 kHz and/or less than 20 kHz, 22 kHz or 25 kHz) may be preferred in some embodiments, such as if the ultrasound receiver of the mobile receiver unit is optimized for audible frequencies and may have only limited ultrasound frequency response. This may be the case where the mobile receiver unit is not a dedicated positioning component, but a portable appliance having one or more other functions, such as a mobile telephone, tablet computer or laptop computer.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS/FIGURES

Certain preferred embodiments of the invention will now be described, by way of example only, with reference to the accompanying drawings, in which.

DETAILED DESCRIPTION

Figure 1:
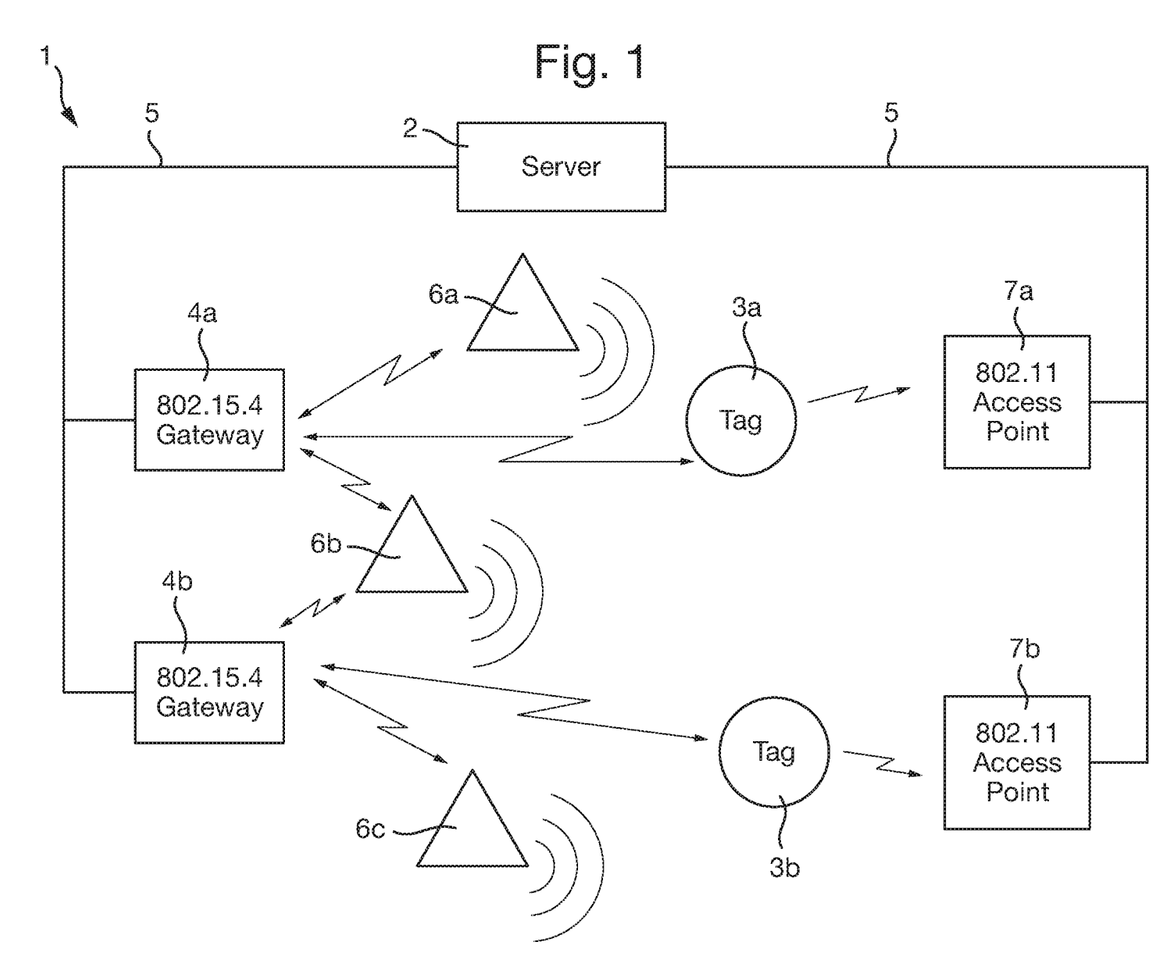
FIG. 1 is a schematic drawing of the main components of a system embodying the invention.

FIG. 1 shows a three-dimensional positioning system 1 which may be installed in a building, such as a hospital. It enables a server 2 to determine the positions of a number of mobile tags 3a, 3b (mobile receiver units) within the building, to a high level of accuracy, in three dimensions. The tags 3a, 3b are typically attached to a person (e.g., by a lanyard around a person's neck, or with a wrist band), or to an item of equipment, such as a thermometer or a hospital bed. A tag may however be integral with, of formed from, another object, such as being a laptop computer or a mobile telephone. Details of an object associated with a tag may be stored on the server 2. The server 2 also stores a map of the environment, such as a plan of floor and wall locations of a building, in which the tags 3a, 3b are present. It may output textual, graphical, or other data indicating the locations of the tags 3a, 3b, such a visual display of a floor plan with the estimated locations and heights of one or more tags marked on the floor plan.

The server 2 is connected to a number of 802.15.4 gateways 4a, 4b by a wired Ethernet network 5. These gateways 4a, 4b contain two-way radios for communicating with a set of static location transmitters 6a, 6b, 6c (static transmitter units) and with the tags 3a, 3b, e.g., using a protocol built on the IEEE 802.15.4 standard. The location transmitters 6a, 6b, 6c and tags 3a, 3b contain two-way radios for communicating with the gateways 4a, 4b.

The location transmitters 6a, 6b, 6c each contain a plurality of ultrasound transmitters for transmitting ultrasonic positioning signals that can be received by the tags 3a, 3b. These signals are typically transmitted with a carrier frequency of 40 kHz, although higher or lower frequencies may be used instead. A carrier frequency of around 20 kHz can be advantageous in some embodiments—e.g., when the tags 3a, 3b are embodied in mobile telephones and use the phone's standard audible-frequency microphone to receive the ultrasound signals. Each location transmitter 6a, 6b, 6c also contains a clock or timer, and circuitry for transmitting ultrasonic positioning signals according to a transmission schedule, stored in a memory of the location transmitter. The positions and orientations of the location transmitters 6a, 6b, 6c in the building are stored on the server 2, e.g., as three-dimensional coordinates of two reference points on each location transmitter 6a, 6b, 6c.

Each of the tags 3a, 3b contains a microphone and associated receiver circuitry for receiving and digitizing ultrasound signals. The tags 3a, 3b also each contain a timer for recording arrival times of the ultrasonic positioning signals, either as absolute clock values or relative to a transmission schedule stored on a memory of the tag. The timer, or clock, may be a simple counter, which may roll over periodically (e.g., every few hours or days). It need not have a concept of universal time.

The tags 3a, 3b may contain radio transmitters for sending IEEE 802.11 multicast signals to 802.11 access points 7a, 7b. The tags 3a, 3b may implement some or all of the Cisco™ Compatible Extensions for Wi-Fi Tags.

The 802.11 access points 7a, 7b are connected to the server 2 by the wired Ethernet network 5.

It will be appreciated that, in practice, a system may have more or fewer servers, tags, location transmitters, gateways and/or access points than are shown in FIG. 1.

The server 2, mobile tags 3a, 3b, gateways 4a, 4b, location transmitters 6a, 6b, 6c and access points 7a, 7b may each comprise one or more processors, microcontrollers, CPUs, DSPs, ASICs, volatile memories, non-volatile memories, analogue circuitry, digital circuitry, power supplies, receivers, transmitters, transducers, inputs, outputs, user interfaces, as appropriate. Some of their operation may be controlled by software.

The location transmitters 6a, 6b, 6c are preferably arranged so that all areas in which the tags 3a, 3b may commonly be found are within audible range of at least one of the location transmitters 6a, 6b, 6c. For instance, every room in a building may contain at least one location transmitter, preferably mounted centrally on the ceiling of the room. In this way, it should be possible for the server 2 to determine which room each tag 3a, 3b is in, because ultrasound is very strongly attenuated by walls, ceilings and doors. In some situations, or for certain tags, such room-level precision may be adequate. However, the system 1 is also capable of determining the position of a tag in three dimensions, with a precision in the order of centimeters or millimeters.

An initial coarse positioning may be carried out by each location transmitter 6a, 6b, 6c transmitting a periodic ultrasound signal that encodes a respective location ID—e.g., by transmitting an FSK-encoded zone ID and area ID as described in WO 2014/020348. This location ID may be transmitted by an omnidirectional speaker on the location transmitter. In some embodiments, the location ID may be transmitted by a directional speaker on the location transmitter; this may be useful when it is desired to partition an open space (such as a room) into a plurality of zones. Once a zone location for a tag 3a, 3b has been determined, a 3D positioning operation can be performed, as described below, if it is desired to locate tags more precisely within the identified zone.

In other embodiments, such a ultrasound-based coarse positioning process is not carried out, and instead the 3D positioning operation allows the position of a tag to be uniquely determined across an entire installation (possibly in conjunction with other location-based information—e.g., obtained from an RF network, or GPS, or an inertial measurement unit (IMU)). This will typically require greater bandwidth for the signals used for the 3D positioning operation, as they will have to encode additional location information, which would otherwise have been supplied by the coarse positioning signals.

The server 2 is responsible for synchronizing the locations transmitters 6a, 6b, 6c and the tags 3a, 3b so that the tags 3a, 3b can save power by not having their ultrasound listening circuitry constantly active, and so that accurate time-of-flight measurements can be determined for precise three-dimensional positioning.

The server 2 sends a respective customized transmission schedule to each location transmitter 6a, 6b, 6c via the 802.15.4 gateways 4a, 4b. Each location transmitter 6a, 6b, 6c then transmits ultrasound positioning signals at intervals, according to its particular transmission schedule. The customized transmission schedules are all based on a common master transmission schedule, but are adjusted for the local clocks of the devices to which they are sent. They are arranged so that the location transmitters 6a, 6b, 6c all transmit their location IDs substantially simultaneously. The location transmitters 6a, 6b, 6c may also be coordinated to transmit 3D positioning signals substantially at the same time as each other. Transmitting ultrasound messages simultaneously, rather than using a time-slotting mechanism, improves the latency of the system and increases battery life in the tags 3a, 3b, which can then spend more time in a sleep state. Nevertheless, in practice it may be desirable to build in some time offsets or varying schedules, in order to overcome "dead spots", where the ultrasound signals destructively interfere with each other. One option is to have all the location transmitters 6a, 6b, 6c transmitting simultaneously in one transmission cycle, and then silence some of them in a determined way in one or more subsequent cycles, in order to avoid the interference in dead spots.

For coarse positioning, the ultrasound protocol and the ultrasound decoders on the tags 3a, 3b are designed such that the decoders can discriminate between multiple ultrasound location transmitter 6a, 6b, 6c, in order to identify a closest location transmitters 6a, 6b, 6c, based both on time-of-flight and signal-strength information, when the ultrasound messages are transmitted simultaneously.

When a tag 3a, 3b receives an ultrasonic location ID signal from one of the location transmitter 6a, 6b, 6c, it decodes the signal to determine the identity of the location transmitter 6a, 6b, 6c that transmitted the signal. The tag 3a, 3b then transmits a multicast 802.11 message encoding the identity of the tag 3a, 3b and the identity of the location transmitter 6a, 6b, 6c. It may also transmit other information. The tags 3a, 3b may stagger their 802.11 transmissions to reduce the chance of collisions.

The 802.11 access points 7a, 7b listen for multicast messages from the tags 3a, 3b, and relay information from the received multicast messages to the server 2.

Of course, other embodiments may use alternative means for transferring the identity information from the tags 3a, 3b to the server 2, such as the tags 3a, 3b transmitting radio messages to the 802.15.4 gateways 4a, 4b, which send the information on to the server 2. In some cases, the system 1 may not require the 802.11 access points 7a, 7b at all, and some preferred embodiments use only 802.15.4-based communication, which can save power compared with 802.11.

When the server 2 receives a message identifying a particular tag 3a, 3b and a particular location transmitter 6a, 6b, 6c, it uses this information to update a coarse position estimate for the tag in a database on the server 2. If the tag 3a, 3b also requires fine 3D positioning, this can also be carried out as described below.

The server 2 may use Doppler-induced velocity information to determine motion of the tag 3a, 3b, which it may use to refine a position estimate for the tag.

Bespoke transmission schedules for the location transmitters 6a, 6b, 6c are generated by the server 2 based on information, stored on the server 2, relating to the respective drift and offset of the clocks in the location transmitters 6a, 6b, 6c. The server 2 determines respective drift and offset information for each clock in the location transmitter 6a, 6b, 6c, the tags 3a, 3b, and the 802.15.4 gateways 4a, 4b, based on transmission and reception time-stamps for routine 802.15.4 messages that are sent by the locations transmitters 6a, 6b, 6c and tags 3a, 3b to the 802.15.4 gateways 4a, 4b. The server 2 determines information about the clocks of the gateways 4a, 4b whenever one of the tags 3a, 3b is in range of two gateways 4a, 4b, such that both gateways 4a, 4b receive the same routine 802.15.4 message from a tag (this can be assumed to happen simultaneously, because radio signals travel at the speed of light).

For accurate three-dimensional positioning, the server 2 may use the models of the clocks of the tags 3a, 3b in one of two ways. The server 2 may send customized versions of the master transmission schedule to the tags 3a, 3b, for their reference; the tags can then use this to calculate times of flight for the ultrasound signals based on the difference between a scheduled transmission time of a positioning signal and its measured arrival time at the tag, according to the tag's internal clock. Alternatively, the server 2 may receive time-of-arrival time stamps from the tags 3a, 3b (stamped by the local clock on the tag), and use a stored model of a tag's clock to translate a received time stamp to a corrected time stamp which accords to a master clock for the system. A master clock could be the server 2's internal clock, or a clock on a master one of the location transmitters 6a, 6b, 6c, for instance. The server 2 can use these corrected time stamps, and knowledge of the transmission schedule, to calculate the times of flight.

In some alternative embodiments, the tags are not synchronized. Instead, time-difference-of-flight (TDOF) information, for the ultrasound signals arriving at a tag, is used to determine a 3D location of the tag. This is an alternative to using time-of-flight (TOF) information to determine 3D location, and does not require the tags to know at what time the transmissions will occur. In some such embodiments, the tags need not have any radio receiver at all. However, a disadvantage of this approach is that it typically requires a tag to obtain at least one additional time-of-arrival (TOA) measurement in order to get as accurate a position estimate compared with when TOF information is available.

To facilitate fine 3D positioning, each location transmitter 6a, 6b, 6c has multiple directional loudspeakers.

Figure 2:
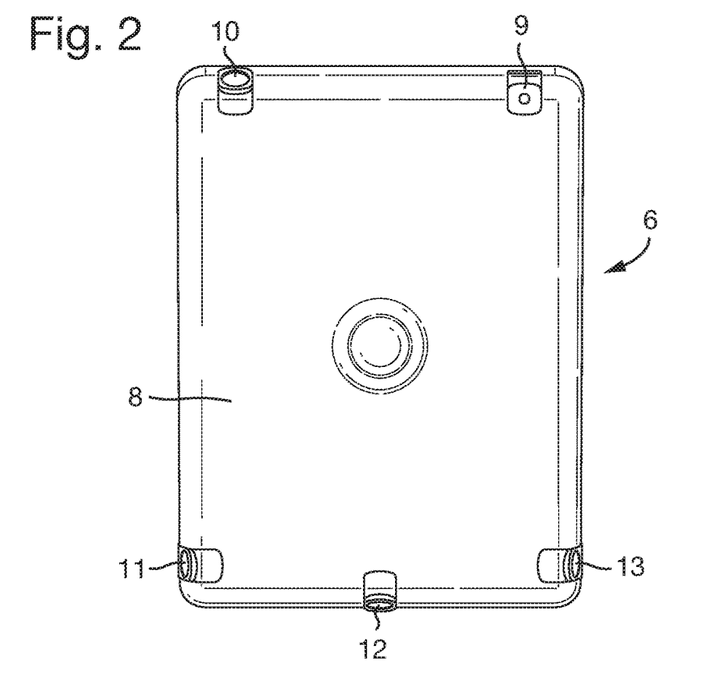
FIG. 2 is a perspective view of a ceiling-mounted location transmitter, from below.

FIG. 2 shows a first design of location transmitter 6, which is a rectangular unit, approximately 20 cm×15 cm×5 cm in size, having a moulded plastic cover 8 over the rectangular front face of the location transmitter 6 and surrounding edges. The rear face of the location transmitter 6 (not shown) is intended to be mounted flush against a ceiling or wall. Mounted in openings around the edges of the front face of the cover 8 are an omnidirectional ultrasound speaker (transducer) 9 and four directional ultrasound speakers (transducers) 10, 11, 12, 13. Two of the directional speakers 10, 12 are mounted on opposite short edges (S) of the rectangular front face, while the other two directional speakers 11, 13 are mounted on opposite long edges (L) of the rectangular front face. In a typical rectangular room, the location transmitter 6 can thus be mounted on the ceiling and have a different directional speaker pointing to each wall of the room.

Each of the speakers 9, 10, 11, 12, 13 is rotatable about an axis (changing its elevation angle, when the location transmitter 6 is mounted on the ceiling) so that the axis of the speaker can be positioned at any position from (i) perpendicularly forwards, out of the plane of the front face of the location transmitter 6 (i.e., straight down to the floor, when mounted on the ceiling), to (ii) parallel to the plane of the front face, away from the location transmitter 6 (i.e., parallel to the ceiling, when mounted on the ceiling). Adjusting the elevations can allow optimal excitation of reflections off the walls (e.g., by angling a speaker so that it avoids a fabric curtain, which might otherwise reduce reflections substantially).

The omnidirectional speaker 9 emits ultrasound substantially uniformly in a hemispherical pattern about its axis. It may comprise, for example, a MA40S4S transducer from Murata Manufacturing Co., Ltd.™ mounted behind a 4 mm diameter circular orifice in a plastic speaker housing. The orifice will cause the ultrasound to diffract widely.

The directional speakers 10, 11, 12, 13 in the embodiment of FIG. 2 are plain MA40S4S transducers from Murata™ having no obstruction or waveguide in front of the transducer. This produces an approximately 40 degree beam (half-power beam width).

Figure 3:
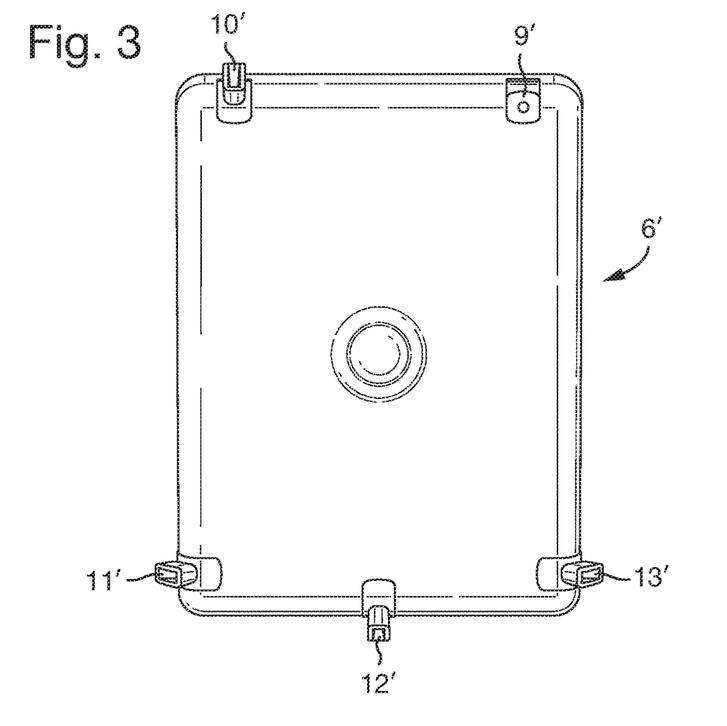
FIG. 3 is a perspective view of an alternative ceiling-mounted location transmitter, from below.

FIG. 3 shows an alternative design of location transmitter 6', which still has an omnidirectional speaker 9', but in which the directional speakers 10', 11', 12', 13' have rectangular-horn waveguides in front of the transducers. The transducers may still be Murata™ MA40S4S transducers; however the use of the waveguides can provide custom beam shapes that are potentially narrower than that of the plain transducer, at least in one axis. The shape and orientation of the waveguides allows considerable control over how the sound spreads.

Other location transmitter designs are, of course, possible. In some embodiments, a location transmitter may comprise an array of ultrasound speakers separated from each other with a spacing of about a wavelength or less, at the carrier frequency, and circuitry arranged to transmit directional signals from the speakers acting as a phased array. This allows the location transmitter to direct beams of ultrasound at different angles, including deliberately directing them towards particular reflective structures such as walls or windows.

Given the low speed of propagation of ultrasound (344 m/s), an attractive feature of using ultrasound for 3D positioning is the capability to measure distances by timing the time-of-flight (TOF), or differential distances by timing the time-difference-of-flight (TDOF) between a pair of receivers. To do this with an accuracy of a few centimeters requires a timing accuracy of approximately 100 microsecond, compared with a timing accuracy of 100 picosecond for electromagnetic-based signals.

By combining TOF measurement from three or more known transmitter locations to a tag 3a, 3b, the position of the tag 3a, 3b can be derived using the principle of trilateration. In the case of TDOF, four or more transmitter locations are required. The positioning accuracy for the tag location is determined by the effective baseline of the transmitter locations together (i.e., how far apart the transmitters are), along with the accuracy of the distance measurements.

Rather than using multiple separate transmitter units to give a wide baseline spread, the present invention exploits reflections off surfaces in the room in order to give a very wide virtual baseline.

Ultrasound reflection off surfaces is a very deterministic process compared with the interaction of electromagnetic waves. Most walls have structure with dimensions that are substantially less than the ultrasound wavelength (9 mm) and have low absorption to ultrasound, so can effectively be considered as mirrors. This means that reflection of an ultrasound signal from a location transmitter 6a, 6b, 6c, effectively creates a new virtual location transmitter that is a mirrored version of the real location transmitter.

In a room with five relatively clean surfaces (four walls and a floor), this means that full observability can be achieved from a single location transmitter 6a, 6b, 6c mounted on the ceiling of the room. The approach can still be applied to irregularly-shaped rooms, even including ones with curved structural surfaces. Reflections off more than one surface can be accounted for in the same way, further enhancing observability of the tags 3a, 3b.

Figure 4:
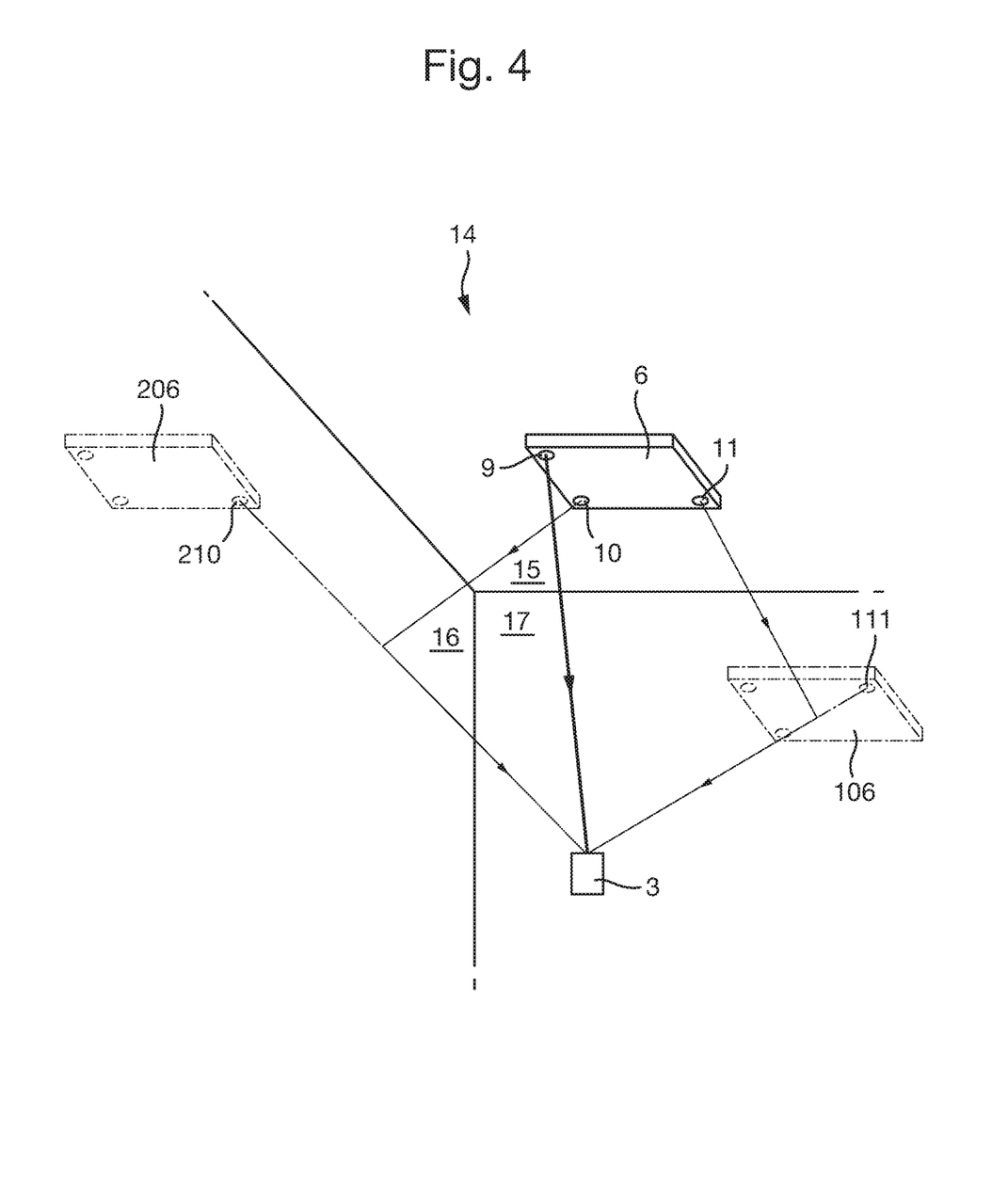
FIG. 4 is a schematic diagram showing various signal paths as well as the positions of two "virtual" location transmitters.

FIG. 4 shows an exemplary installation of a location transmitter 6 in a room 14, which contains a tag 3. The location transmitter 6 is installed on the ceiling 15 of the room 14. A side wall 16 and a back wall 17 of the room 14 are shown. (The room 14 does, of course, have other walls and a floor which are not shown here). Sound from the omnidirectional speaker 9 should be able to reach the tag 3 along a direct path, wherever the tag 3 is in the room 14, unless the path is obstructed. One of the directional speakers 10 is angled so that its axis is directed towards the side wall 16. Another of the directional speakers 11 is angled so that its axis is pointing towards the back wall 17. Depending on the directivity of these directional speakers 10, 11, little or no sound energy may reach the tag 3 from them along direct paths. However, ultrasonic signals emitted from the directional speaker 10 pointing towards the side wall 16 will be reflected by the side wall 16 and will reach the tag 3, with relatively high signal strength, from the side wall 16 (unless the signal is obstructed or the tag 3 is too far away). Similarly, ultrasonic signals transmitted by the directional speaker 11 angled towards the back wall 17 will be reflected by the back wall 17 and may reach the tag 3, with relatively high signal strength, from the back wall 17 (unless the signal is obstructed or the tag 3 is too far away).

The signals received off the back wall 17 will, to the tag 3, have the appearance of coming from a directional speaker 111 of another location transmitter 106 situated behind the back wall 17. The positions of the speakers on this virtual location transmitter 106 are the mirror image of the positions of the speakers on the real location transmitter 6. Similarly, the signals received by the tag 3 from the side wall 16 will appear to come from a directional speaker 210 on a further virtual location transmitter 206 located on the far side of the side wall 16 from the tag 3. Again, this virtual location transmitter 206 will be a mirror image of the real location transmitter 6.

A challenge with TOF or TDOF positioning is that there are no analytic expressions to calculate the position of tag from three TOF measurements, or from any number of TDOF measurements, that work well in the presence of noise (i.e., a slightly inconsistent set of measurements). An analytic approach for TOF does exist (Chan's method) but relies on the knowledge of four paths, which results in greater complexity for deployment as well as during the position-determining process.

The server 2 therefore uses an iterative, least-square minimization approach to estimate the positions of the tags 3a, 3b. Such iterative methods only converge when paths have been correctly associated with the real and/or virtual location-transmitter positions (path assignment) and when a good initial tag position estimate can be made. The method implemented in the server 2 uses received signal strength indicator (RSSI) data to perform path assignment. The server 2 also calculates an initial position estimate for subsequent iterative timing-based calculations. Once a tag 3a, 3b has been successfully positioned and remains under continuous coverage of ultrasound signals, the latest position calculation for the tag can be used as an initial estimate for the next positioning cycle (optionally extrapolated using an estimated velocity and/or accelerometer vector, which may be calculated from earlier position estimates and/or from Doppler-induced velocity information determined by analyzing the ultrasound signal received by the tag).

The 3D positioning operation therefore comprises three distinct operations:

(1) associating each received signal with a unique direct or reflected path from one of the real or virtual speakers 9, 10, 11, 12, 13 (referred to herein as "path assignment");

(2) calculating an initial position estimate for the tag 3, to input into the next stage (this operation may be required only initially, and not on subsequent positioning cycles); and (3) using time-of-arrival measurements to perform trilateration to locate the tag 3, based on straight-line paths from the tag 3 to a respective real and virtual location transmitter corresponding to each timing measurement.

The first operation uses signal strength and timing information, while the third operation uses only timing information.

In order to facilitate accurate measurement of the time of arrival (TOA) of an ultrasonic signal from one of the speakers 9, 10, 11, 12, 13 of a location transmitter 6, the transmitted signal contains at least one chipping sequence, such as a Barker code. The transmitted signal may contain a zone ID and area ID portion, for coarse positioning, followed by a 3D positioning portion comprising one or more chipping sequences. In some embodiments, the signal may contain multiple Barker codes; for example, it may be a signal as described in WO 2012/137017. The identity of each speaker 9, 10, 11, 12, 13 is encoded in each ultrasound signal it transmits. However, the challenge of path assignment is that all direct and reflected signals from a particular speaker carry the same identifier and so cannot be distinguished based on coding. Instead, other factors such as signal strength and time-of-arrival are used.

Each tag 3a, 3b measures times of arrival and RSSI values from observed peaks in the signals received at its microphone in the relevant frequency band (e.g., around 40 kHz). The identification of peaks in the microphone signal is facilitated by the use of Barker DSSS codes, which yield strongly peaked correlations. In some embodiments, the tags 3a, 3b carry out Barker correlation operations to identify the positions and correlation strengths of correlation peaks in the received signals, and transmit such peak information to the server 2 by radio (typically via the 802.11 access points 7a, 7b, or via the 802.15.4 gateways 4a, 4b).

Figure 5:
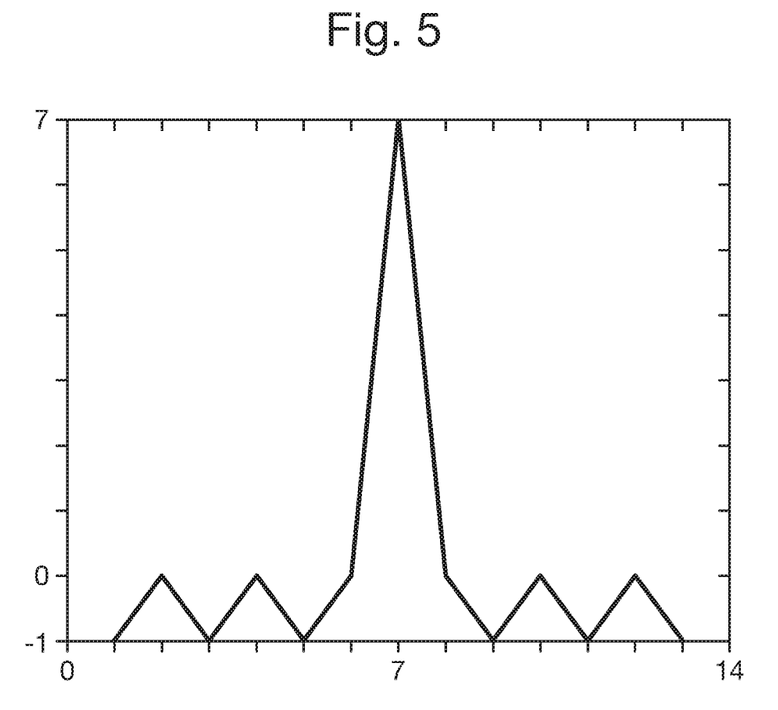
FIG. 5 is a graph of a typical autocorrelation function.

FIG. 5 shows the autocorrelation function of a Barker-7 code, in which the strong correlation peak is clearly visible.

Correlating the received signals against a Barker code, using a standard approach, has been found to give a timing resolution of around 10 cm accuracy. However, the present system uses an approach based on oversampling the Barker correlation data, which gives better resolution.

The DSSS chip rate is typically 4,000/s, which is well matched to the bandwidth of the Murata™ ultrasound transducer. The chip rate is then an integer factor of ten lower than the carrier frequency (40 kHz), which is an advantage in the decoder algorithm. The decoder processing is as follows:

1. the microphone signal is sampled at four times the carrier frequency—i.e., 160 kS/s (kilo-samples per second);
2. samples are quadrature mixed at the carrier frequency (40 kHz) to obtain a complex signal stream at baseband, at 2×40 kS/s;
3. a further reduction of the sample rate, without the loss of information, is realized by decimation or averaging; the sample is critically sampled when decimating or averaging by a factor of ten, which would result in a complex IQ data stream of 2×4 kS/s; however, by averaging less aggressively—for example, every five samples (2×8 Ks/s)—significantly better distance accuracy is derived from the peak shape.

By oversampling the chip rate by a factor of two (2×8 kS/s), the Barker correlation magnitude data can be used to obtain sub-wavelength resolution—better than 8.5 mm.

For chipping sequences with sharply-peaked auto-correlation properties, an accurate peak location estimate can be obtained using the following three-point peak detection algorithm:

calculate the gradients either side of the point $x_n$: $a = x_{n+1} - x_n$, and $b = x_n - x_{n-1}$;

detect the presence of a peak near $x_n$ if a<0 AND b>0 AND $x_n$ exceeds a suitable threshold; and calculate the precise peak location as: n+b/(b−a)−0.5.

When the magnitudes of the gradients a and b are equal, the location will be given as n. If a is steeper than b, the peak location will be placed up to half a sample below n, while if b is steeper than a, the peak location will be placed up to half a sample above n.

Using this three-point peak finder, typically many peaks (~30-100 per speaker channel) are found for each of the five speakers 9, 10, 11, 12, 13 of the location transmitter 6, when a low threshold is used. The server 2 knows the time-of-flight of each peak very accurately (to a few millimeters). Some embodiments may use more complex methods may be used to find estimated peak locations with sub-sample accuracy—e.g., which take into account the shape of the correlation curve—however, these require more computational complexity.

In order to reduce this number down, a crude distance-based filter is applied, which discards those peaks that relate to signal amplitudes that are too low. This is justified because such peaks are likely to come from small reflective surfaces whose locations are not known to the system. Rather than applying a flat amplitude threshold at all distances, an allowance is made for amplitude to decline with distance (represented by time of arrival). In one embodiment, only those peaks whose amplitude is greater than a threshold/(distance^2) are retained.

The omni-directional speaker 9 on the location transmitter 6 plays an important role. First, due to its omni-directional signal, it is the channel that is most likely to be received by all tags 3 in the vicinity of the location transmitter 6. Secondly, the ratio of magnitude between a directional channel and the omni-directional channel (reflected off the same surface or surfaces as the directional channel) gives important information about the path direction of the signal over the directional channel.

For this reason, the remaining peaks are filtered again, by keeping only the n omni-directional peaks that have the n largest magnitudes, where n may typically be in the range 6 to 10.

The process of path identification than proceeds by finding other speaker channels that show peaks in close temporal proximity to the identified omni-directional peaks. The fact that such pairings or clusters exist is a consequence of the fact that, for a particular path, all the speaker signals originating from a single location transmitter 6 (real or virtual) are within a maximum time-of-flight distance window of each other, defined by the actual separation of the directional speakers 10, 11, 12, 13 from the omni-directional speaker 9 on the device. To account for the limited resolution in identifying peaks, an additional distance margin can be added to the omni-directional to directional speaker separation threshold for identifying these clusters (e.g., 5 cm+the actual separation distance on the location transmitter 6 between the omni-directional speaker 9 and the respective directional speaker 10, 11, 12, 13).

Since multiple different paths from a location transmitter 6 to a tag 3, via one or more reflective surfaces, may have similar path distances, multiple peaks may occur for each directional-speaker channel within the distance window around each omni-directional peak. Each omni-directional peak is therefore associated with k associated peaks for each speaker channel, where $0 \leq k \leq 4$. If two location transmitter paths overlap in distance, there might—for example—be 6 to 10 peaks in close vicinity. These peaks then have to be separated between the two location transmitter locations. This is done by identifying all combinations of directional-speaker channel peaks for a particular omnidirectional peak, and subsequently analyzing these candidate peak clusters for consistency based on received signal strength indicator (RSSI) and time-difference-of-arrival (TDOA), so as to select the most plausible candidate.

The first step in filtering the candidates associated with each omni-directional peak is to separate them by whether they are from a speaker 11, 13 on the long side of the location transmitter 6 (denoted L, for "long side"), or from a speaker 10, 12 on the short side of the location transmitter 6 (denoted S, for "short side"). They are then ordered, for each group L, S, by descending amplitude. The reason to classify them by L, S type is that, due to the directional and opposing nature of each of the L and S pairs, seeing significant peaks within the L and S type for opposing speakers along the same path is highly unlikely. Selecting the most significant L and S peaks also effectively determines from which quadrant around the location transmitter 6 the signal path originates, each quadrant being centered on a different respective corner of the rectangular location transmitters (i.e., top-left, top-right, bottom-right, bottom-left, when viewing FIG. 2).

After sorting the peak candidates associated with each omni-directional peak by L or S type, the tag 3 or server 2 proceeds by finding <L, S, X> combinations that have qualifying amplitude ratios and time lags, where L, S and X here denote correlation peaks (and the magnitudes of these peaks) relating to a long-side speaker 11, 13, a short-side speaker 10, 12, and the omni-directional speaker 9, respectively.

First, L and S peak ratios are compared with the omni-directional peak magnitude. The idea behind this is that, due to the opposing directional nature of the L and S transducer pairs, the large magnitude L or S peaks are of primary interest. The server 2 therefore calculates, for each omni-directional peak X, the harmonic average of the amplitude ratios L/X and S/X for all peaks, L, S, associated with that omni-directional peak X. The harmonic average, or 0.25, whichever is higher, is then used as the threshold value for filtering L, S peak combinations for that omni-directional peak X.

The position of a tag can be considered as a straight path from a real or virtual location transmitter, in spherical coordinates $(r, \theta, \varphi)$, where r is distance, $\theta$ is elevation (inclination or declination) from a normal to the plane of the front face 8 of the transmitter 6, and $\varphi$ is azimuth angle in the plane of front face 8 of the transmitter 6 (i.e., in the plane of the ceiling if the location transmitter is mounted on the ceiling).

Empirically, when the speakers 10, 11, 12, 13 are set at 60 degrees to a normal to the front face 8 of the transmitter 6, the following amplitude ratio has been found to be approximately linear with the spherical inclination angle $\theta$:

$$\text{Sum}_{Ratio} = (L+S)/(L+S+X)$$

Bounds for this value $\text{Sum}_{ratio}$ can be calculated from the angle setting of the L, S and X speakers. For L and S at an elevation of 60 degrees from a normal to the front face 8 of the transmitter 6 and X at 0 degrees, the bounds are $0.5 \leq \text{Sum}_{ratio} \leq 0.9$. This, combined with the harmonic average threshold above, allows us to filter L, S, X peak combinations.

A good estimate for $\theta$, for a location transmitter as depicted in FIG. 2, with speakers 10, 11, 12, 13 set at 60 degrees, has been found to be:

$$\theta = 180 \times \text{Sum}_{ratio} - 85$$

When the speakers 10, 11, 12, 13 are set at different angles, alternative relations can be determined, through measurement or simulation.

Next, the angle of arrival is estimated from amplitude ratios.

For consistent L, S, X amplitude combinations, the path angles can be estimated. The elevation angle can be estimated based on the sum ratio, above. The second path angle, the azimuth angle $\varphi$, can be estimated using another ratio, $$\text{Min}_{ratio} = \frac{L-S}{L+S}$$

as $$\varphi = 45 + (-1)^n \times 45 \times \text{Min}_{ratio} + 90 \times n, n \in \{0,1,2,3\}$$

The value of φ=45 represents the line of equi-amplitude of the L, S pair. The second part of this equation is the angle deviation from this equi-amplitude diagonal line. The third part is the offset relative to the quadrant as defined by the actual L, S pair considered. The variable n is the quadrant number, where the quadrants have been numbered clockwise around the location transmitter.

Suppose each of the directional speakers, i, is at a respective Cartesian vector position [$r_{i3}$], with the omnidirectional speaker X as the origin. In almost all realistic circumstances of paths from location transmitter to tag, the separation between transducers is small compared to the location-transmitter-to-tag distance, R. Under these conditions all of the speakers on the location transmitter are at essentially the same angle of observation, from the perspective of a tag in the room. With known angles of observation, the time lag between the channels (or equivalently the distances between paths) can be calculated.

First of all the server 2 calculates the Cartesian normalized path vector $R_{norm}$:

$$\overrightarrow{R_{norm}} = \begin{pmatrix} \sin\theta\cos\varphi \\ \sin\theta\cos\varphi \\ \cos\theta \end{pmatrix}$$

The difference between the path distance for a particular L or S speaker, i, and the distance to the omni-directional speaker 9, for a physical peak-path cluster can be approximated by:

$$\Delta R_{i3} = [r_{i3}]\overrightarrow{R\_norm}$$

which is the projection of the displacement vector for speaker i, with respect to the omni-directional speaker 9, onto the path to the tag.

This relationship means that the server 2 can check peak combinations for consistency between observed amplitudes and relative distance. This consistency check is performed by evaluating all peak cluster candidates (omni-directional speaker peaks associated with different L and S peak combinations, within a distance window) for the relative transducer distances ($\Delta R_{i3}$), first, as measured based on peak locations, and, secondly, as estimated from the signal magnitude ratios as described above. The mean squares error sum between the measured and the estimated relative distances then provides an objective measure, which is used to select peak combinations that are likely to originated from a single identical LT source (real or virtual).

To summarize:

1. From all omnidirectional to L-S peak combination candidates, the server 2 first selects, based on amplitude ratios, those L, S, X combinations that have large and physically consistent ratios ($Sum_{ratio}$ bounded, within the top ratio values of the set);

2. For each valid L, S, X combination, the server 2 calculates the spherical angles of observation—azimuth and elevation;

3. From the angles of observation the server 2 calculates, for each of the L, S transducers, the expected path length difference from the X transducer;

4. The server 2 compares the observed path length differences with the estimated path length differences, and calculates the sum of squared path length difference errors; and a. The best L, S, X combinations can now be selected, being those that have the lowest sum squared errors and that meet a threshold for the individual sum squared errors.

The results of this procedure is an identification of sets of correlation peaks across the separately-coded speaker channels which have been identified as belonging to a physically-consistent path between the location transmitter and the tag (i.e., showing consistency between amplitude and time lag).

Using the above procedure the server 2 can identify the observation vector of a location transmitter from the perspective of the tag (a path), based on the cluster of correlation peaks that result from the five speakers in the location transmitter. This can be done as long as a combination of three L, S, X peaks are observed that are consistent in amplitude and time lag. What now remains is to find out which possible location-transmitter positions these observation vectors are associated with. In the case where the location transmitters are real physical units this is not normally a challenge due to the different codes or time slots that each location transmitter uses. However, in the case of reflections, the virtual location transmitters cannot easily be distinguished from each other and from the real location transmitter.

Virtual location transmitters can be generated through the process of mirroring a real location transmitter 6 in any significant reflective surface (walls, ceiling, floor, windows, etc.). It is believed that, in most circumstances, up to second order mirroring (i.e., up to two reflections) sufficiently covers the most significant peak clusters that can be observed in a normal room. Note that attenuation due to absorption by the reflective surfaces can be accounted for in this process, if desired.

All properties of a location transmitter are mirrored and attenuated under reflection.

For a ceiling mounted unit, the server 2 can consider the 1st, 2nd and possibly 3rd order reflections in all four walls of a rectangular room (whose positions are known to the server 2), leading to twelve virtual location-transmitters positions and one real location-transmitter position. The 3rd order may be useful in some unusual situations, such as where the 2nd order wall reflections are mirrored in the floor surface.

Once the server 2 has identified physically-consistent peak combinations that are likely to belong to a single path between a location transmitter (real or virtual) and a tag, the server 2 can refine the observation angles (azimuth and elevation) based on the observed time lags. The server 2 knows the distance between the tag and the location transmitter very accurately, due to the synchronized schedules and the accurate three-point peak detection operation described above. A time-difference-of-flight (TDOF) approach can therefore advantageously be used to improve the estimates of the angles of arrival.

The method relies on minimizing the sum of squared terms of $(\Delta R_{i3} - \Delta R_{i3} obs)^2$. The error between calculated and observed lag is minimized by iteratively approximating the observation angles x using a linearized version of the $\Delta R_{i3}$ expression:

$$\Delta R_{i3} - \Delta R_{i3} obs \cong \frac{\delta \overrightarrow{R\_norm}}{\delta x}[r_{i3}]x$$

In each iteration the server 2 calculates the matrix:

$$H = \frac{\overrightarrow{\delta R\_norm}}{\delta x}[r_{i3}] = \begin{bmatrix} \cos\theta\cos\varphi & \cos\theta\sin\varphi & -\sin\theta \\ \sin\theta\sin\varphi & \sin\theta\cos\varphi & 0 \end{bmatrix}[r_{i3}]$$

using the last estimate of the angles x.

The observation angles from the amplitude ratios $\text{Sum}_{ratio}$ and $\text{Min}_{ratio}$ are used as the starting condition for the minimization operation.

A new update of the observation angles x can now be calculated by solving the following liner system of equations for x:

$$\Delta R_{i3} - \Delta R_{i3}\text{obs} = Hx$$

This requires a minimum of three different peaks, <L, S, X>, being correctly identified, in which case a 2×2 matrix H is obtained.

The iterative procedure is stopped once the change in angles falls below a predetermined threshold, or, in the case of non-convergence, after a threshold number of iterations is reached.

Finally, using the improved estimate of the angles-of-arrival based on the observed lag, the server 2 can now calculate the observation vector of the paths in the coordinate system of the real location transmitter.

The process of assigning observation vectors to originating real or virtual location transmitters can most easily be done based on directional information and/or distances. Its reliability and computational efficiency can be greatly enhanced by appropriate design choices in speaker position and directivity. Various assignment methods are possible:

A. Geometry-Based

A room's major reflectors typically consist of its walls and floor. This insight can be used by positioning the location transmitters 6 such that each directional (or waveguide) speaker faces a different wall, and the omni-directional transducer faces towards the floor. A combination of amplitude and distance information for each observation vector can then be used to assign observation vectors to originating real and virtual location transmitter positions, as follows:

1. Cluster the observation vectors based on their distance information. This results in groups of observation vectors <L, S, X> originating from the same real or virtual location transmitter. In cases where the tag is equidistant to two location transmitter positions, the observation vectors' amplitude and directional information are used to separate the overlapping paths.

2. Each <L, S, X> cluster's received signal strength indicator (RSSI) information is used to create a corresponding set of candidate location transmitter positions. Since each speaker is directed at a different reflector, each location transmitter position has a respective dominant path, meaning a path with lowest attenuation level. The clusters' amplitude information allows the server 2 to estimate which location transmitter images are more likely to generate each cluster's paths.

3. Given their respective set of location transmitter candidates, each <L, S, X> cluster can be assigned to an originating location transmitter based on its distance information. The clusters' distance information allows the order of the originating location transmitter (line-of-sight, 1st order reflection, . . . , $n^{th}$ order reflection) to be estimated.

B. Angle-Based

Given a cluster <L, S, X> of observation vectors originating from the same location transmitter, the server 2 can estimate its angle-of-arrival without any knowledge of the location transmitter's position (see above). This information can be used to assign each cluster to its originating location transmitter, as follows:

1. Cluster the observation vectors based on their distance information. This results in groups of observation vectors <L, S, X> originating from the same real or virtual location transmitter. In cases where the tag is equidistant to two location transmitter positions, the observation vectors' amplitude and directional information are used to separate the overlapping paths.

2. Estimate the angle-of-arrival of each cluster. Add the observation vectors' distance information (TOF). This results in a vector-of-arrival for each cluster. If a cluster is assigned to the correct location transmitter, the vector should point to the tag's position. If the distance information is not available (e.g., when using only TDOF), the vectors of arrival can be replaced by infinite lines.

3. If a rough estimate of the tag's position is available, each cluster can be assigned to the real or virtual location transmitter position for which its vector-of-arrival points the closest to the tag's position estimate. If using TDOF, the criterion is the line's closest point to the tag position estimate.

4. Otherwise find the combination of <cluster, location transmitter> which results in the smallest group of vector-of-arrival points. They should all point towards the same position, within an error margin. If using TDOF, the criteria are the intersection points of each pairwise line of arrival.

C. Quadrant-Based

This approach exploits the fact that a virtual location transmitter with an odd number of reflections is distinguishable from the real location transmitter and from virtual location transmitters with an even number of reflections, because the layout of the speakers on the location transmitter are different. The approach is to:

1. Identify the quadrant for the path with the shortest distance based on the coarse screening of peaks (n largest X peaks filtered using the distance-dependent amplitude threshold), from the identities of the L and S speakers in the cluster.

2. Calculate bounds for the tag position based on the quadrant (knowing the position and orientation of the real location transmitter, and the positions of the walls, floor and ceiling) with a suitable error margin.

3. Try out which combinations of observation vector and real or virtual location transmitter result in a tag position within the physical room, and keep those.

Any of these assignment methods gives a number of paths and associated location transmitter position candidates that can be used in subsequent processing to calculate the tag position with improved accuracy and consistency.

The tag position is then finally calculated by trying a number of combination of the path and location transmitter candidates using various trilateration techniques.

Due to inaccuracies in TOF or TDOF measurements, standard trilateration techniques are unable to reliably estimate a tag's position. The principle of geometric dilution of precision (GDOP) is a major concern for indoor positioning systems, for which the error measurements are typically in the order of centimeters, and the distance between landmarks is limited to meters.

The most powerful algorithm in this respect is a non-linear successive approximation algorithm to obtain the least square error sum between path length and the estimated tag position. The use of an analytical expression for the Jacobian gives a good speed advantage. A variant of the algorithm is a combination this non-linear method with a linear least squares method. Both methods are described in "Determination of a position in three dimensions using trilateration and approximate distances" by W. Murphy and W. Hereman, Technical Report MCS-95-07, Department of Mathematical and Computer Sciences, Colorado School of Mines, Golden, Colo. (1995).

The non-linear method, using an analytical expression of the Jacobian matrix, gives very accurate position estimates regardless of its initial position input, assuming that the assignment of paths to location transmitter positions has been done correctly. But a good initial position estimate can greatly decrease the method's convergence time. The linear method using QR decomposition is extremely fast, but results in very inaccurate position estimates in the vertical dimension, although its horizontal coordinates are quite accurate. The linear method is therefore preferably used by the server 2 to obtain a 2D initial position estimate, which can be provided as input to the non-linear method to get a final 3D position estimate, for the current positioning cycle. On subsequent positioning cycles, the position estimate from the previous cycle may be used as an estimate for the next cycle.

In the case where fewer than three paths have been identified, a trilateration approach is not feasible. Instead, TDOA information from three or more transducers in the single closest LT location is used to determine an accurate angle-of-arrival estimate, using the approach described above of minimizing the sum of squared terms of $(\Delta R_{i3} - \Delta R_{i3} \text{obs})^2$. The closest LT can be identified based on the lags and the distance from the omnidirectional speaker to the tag. Perhaps surprisingly, this approach has been found to result in a more accurate position estimate than using information relating to two LT positions, so this is what the server 2 does in this situation to get an initial position estimate.

A combination that involves real and virtual location transmitter positions that lie along a straight line can result in poor resolution in a direction orthogonal to the straight line, so the server 2 advantageously tries to avoid such location transmitter position combination in the trial solutions, by checking the angles between the LT positions used.

An estimate of a least square error can be obtained from the position estimate algorithm by the server 2, which can be used to select the most accurate combination of location transmitter position and paths.

Once the server 2 has arrived at a final position estimate for the tag, it can output this to a user in any suitable way—e.g., by displaying the tag in a three-dimensional representation of a room. The server 2 may use additional information, such as velocity information from Doppler-shift measurements, or temporal or spatial continuity assumptions, to further improve accuracy when tracking the tag.

Depending on the most optimal trade-off between power usage and processing capabilities, some or all of the positioning operations assigned to the server 2 might instead be implemented in the tag 3 (or a mobile device providing the same functionality as the tag). For example, in the case of the tag being embodied in a smartphone, there is more than adequate processing power to perform the positioning tasks described above on the smartphone itself, rather than on a server 2. This might also be advantageous from a user privacy perspective in that the user's location is generated on the mobile device and not shared with anyone.

Conversely, in some embodiments, the tag 3 or mobile device may perform only minimal processing of the ultrasound signal—e.g., to reduce bandwidth—but otherwise transmit the ultrasound signals it receives, to the server 2, in their entirety. This could use conventional audio streaming techniques. In this way the infrastructure and the server application can easily be updated and changed, without affecting the tag 3.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A system for determining a position of a mobile receiver unit in an environment, the system comprising:
   a transmission apparatus, comprising a plurality of ultrasound transmitters and being configured to transmit a plurality of ultrasonic signals in different respective principal directions from the transmission apparatus, each ultrasonic signal encoding a different respective direction identifier;
   a mobile receiver unit, comprising an ultrasound receiver and being configured to receive the plurality of ultrasonic signals along a plurality of signal paths, wherein at least one of the signal paths includes a reflection off a surface in the environment;
   a database for storing location information relating to the transmission apparatus and to the surface in the environment; and
   a processing system,
   wherein:
   the processing system comprises a decoder configured to decode the respective direction identifiers from the received ultrasonic signals;
   the processing system is configured to determine, for each of the signal paths, a respective time of arrival of the respective ultrasonic signal at the mobile receiver unit; and
   the processing system is configured to access the database to receive location information relating to the transmission apparatus and to the surface in the environment, and to use the location information, the respective direction identifiers, and the times of arrival, to calculate an estimate of the position of the mobile receiver unit.

2. The system of claim 1, wherein the transmission apparatus is a single, static transmitter unit.

3. The system of claim 1, wherein the transmission apparatus comprises an omnidirectional transmitter and at least two directional transmitters.

4. The system of claim 1, wherein the transmission apparatus comprises at least one pair of transmitters that are arranged to transmit ultrasonic signals along respective principal directions that are non-parallel, coplanar vectors.

5. The system of claim 1, wherein the transmission apparatus comprises a first pair of transmitters arranged to transmit ultrasonic signals in directions parallel to a first plane, and a second pair of transmitters arranged to transmit ultrasonic signals in directions parallel to a second plane, wherein the first and second planes are orthogonal planes.

6. The system of claim 1, wherein each ultrasonic signal comprises a chipping sequence, encoded on a carrier signal at a chip rate, and wherein the processing system is configured to:
   sample the received ultrasonic signals at a sampling rate, higher than the chip rate;
   cross-correlate the sampled ultrasonic signals with a chipping sequence to generate data representing correlation magnitude over time; and use a derivative of the correlation magnitude data over time to determine a position of a peak in the data at a temporal resolution that is finer than the sampling rate.

7. The system of claim 1, wherein the mobile receiver unit is configured to determine signal strength information for each received signal, and wherein the processing system is configured to associate each received signal with a respective signal path based on the signal strength information and on the times of arrival.

8. The system of claim 1, wherein the processing system is configured to identify one or more clusters of times of arrival for signals encoding different respective direction identifiers that are, for each cluster, within a predetermined maximum time-of-flight distance window of each other.

9. The system of claim 8, wherein the processing system is configured, for each cluster of the one or more clusters, to use signal strengths of signals arriving in the cluster to calculate a respective first estimate of an angle of arrival, in two or three dimensions, for a signal path, and to use the first estimates of angles of arrival to select a subset of the clusters for which the times of arrival in each selected cluster satisfy a consistency test related to positions of the ultrasound transmitters on the transmission apparatus.

10. The system of claim 9, wherein the processing system is configured to calculate a ratio between a first signal strength of a first signal received from an omnidirectional transmitter and a second signal strength of a second signal received from a respective directional transmitter, and to use the ratio to calculate the first estimate of the angle of arrival for the signal path.

11. The system of claim 9, wherein the processing system is configured, for each cluster in the subset of clusters, to use the times of arrival of signals arriving in the cluster to calculate a respective second estimate of the angle of arrival, in two or three dimensions.

12. The system of claim 9, wherein the processing system is configured to use any one or more of amplitude information, distance information, and angle-of-arrival information, to assign each cluster in the subset of clusters to a real or virtual position of the transmission apparatus.

13. The system of claim 1, wherein the processing system is configured to use the times of arrival to perform a multilateration operation to estimate the position of the mobile receiver unit.

14. A method of determining a position of a mobile receiver unit in an environment, the method comprising:
transmitting a plurality of ultrasonic signals in different respective principal directions from a transmission apparatus, each of the ultrasonic signals encoding a different respective direction identifier;
receiving the plurality of ultrasonic signals at the mobile receiver unit along a plurality of signal paths, wherein at least one of the signal paths includes a reflection off a surface in the environment;
decoding the respective direction identifiers from the received ultrasonic signals;
for each of the signal paths, determining a respective time of arrival of the respective ultrasonic signal at the mobile receiver unit;
accessing a database to receive location information relating to the transmission apparatus and to the surface in the environment; and
using the location information, the respective direction identifiers, and the times of arrival, to estimate the position of the mobile receiver unit.

15. The method of claim 14, wherein at least one of the signal paths is a direct path.

* * * * *